United States Patent [19]
Ness

[11] 3,738,714
[45] June 12, 1973

[54] TREAD FOR MOTOR DRIVEN VEHICLES
[75] Inventor: William G. Ness, Thief River Falls, Minn.
[73] Assignee: Arctic Enterprises, Inc., Thief River Falls, Minn.
[22] Filed: Feb. 19, 1971
[21] Appl. No.: 116,949

Related U.S. Application Data
[63] Continuation-in-part of Ser. No. 63,626, Aug. 13, 1970, abandoned.

[52] U.S. Cl................. 305/24, 180/5 R, 305/35 EB
[51] Int. Cl....................... B62d 55/12, B62m 27/00
[58] Field of Search .................. 305/35 EB, 37, 38, 305/56; 74/231 C; 180/5 R

[56] References Cited
UNITED STATES PATENTS

| | | | |
|---|---|---|---|
| 2,461,849 | 2/1949 | Slemmons............................. | 305/38 |
| 3,485,312 | 12/1969 | Swenson ............................ | 180/5 R |
| 3,510,174 | 5/1970 | Lamb.......................... | 305/35 EB X |
| 2,461,850 | 2/1949 | Slemmons......................... | 305/38 X |
| 3,451,728 | 6/1969 | Bruneau..................... | 305/35 EB X |
| 3,285,676 | 11/1966 | Hetteen ............................ | 305/38 X |
| 3,582,154 | 6/1971 | Russ................................... | 305/38 |
| 1,975,725 | 10/1934 | Martinage...................... | 305/35 EB |
| 3,575,474 | 4/1971 | Russ.............................. | 305/35 EB |
| 1,438,859 | 12/1922 | Rimailho......................... | 305/35 EB |

FOREIGN PATENTS OR APPLICATIONS
709,659   5/1931   France............................ 305/35 EB

*Primary Examiner*—Richard J. Johnson
*Attorney*—Donald J. Koprowski

[57] ABSTRACT

A tread for motor driven vehicles, such as snowmobiles, in the form of an endless belt having rows of spaced sprocket wheel receiving elements integral therewith and with slide pads positioned on the belt on either side of the elements to support the sprocket wheel and guide rails of the suspension system of the tread. The slide pads are made of a low coefficient of friction material to reduce wear and heat problems, with the guide pads having notched surfaces therein for positive guiding of the sprocket teeth and rails of the suspension system, and including clips secured to, or pockets formed in, the endless belt.

10 Claims, 10 Drawing Figures

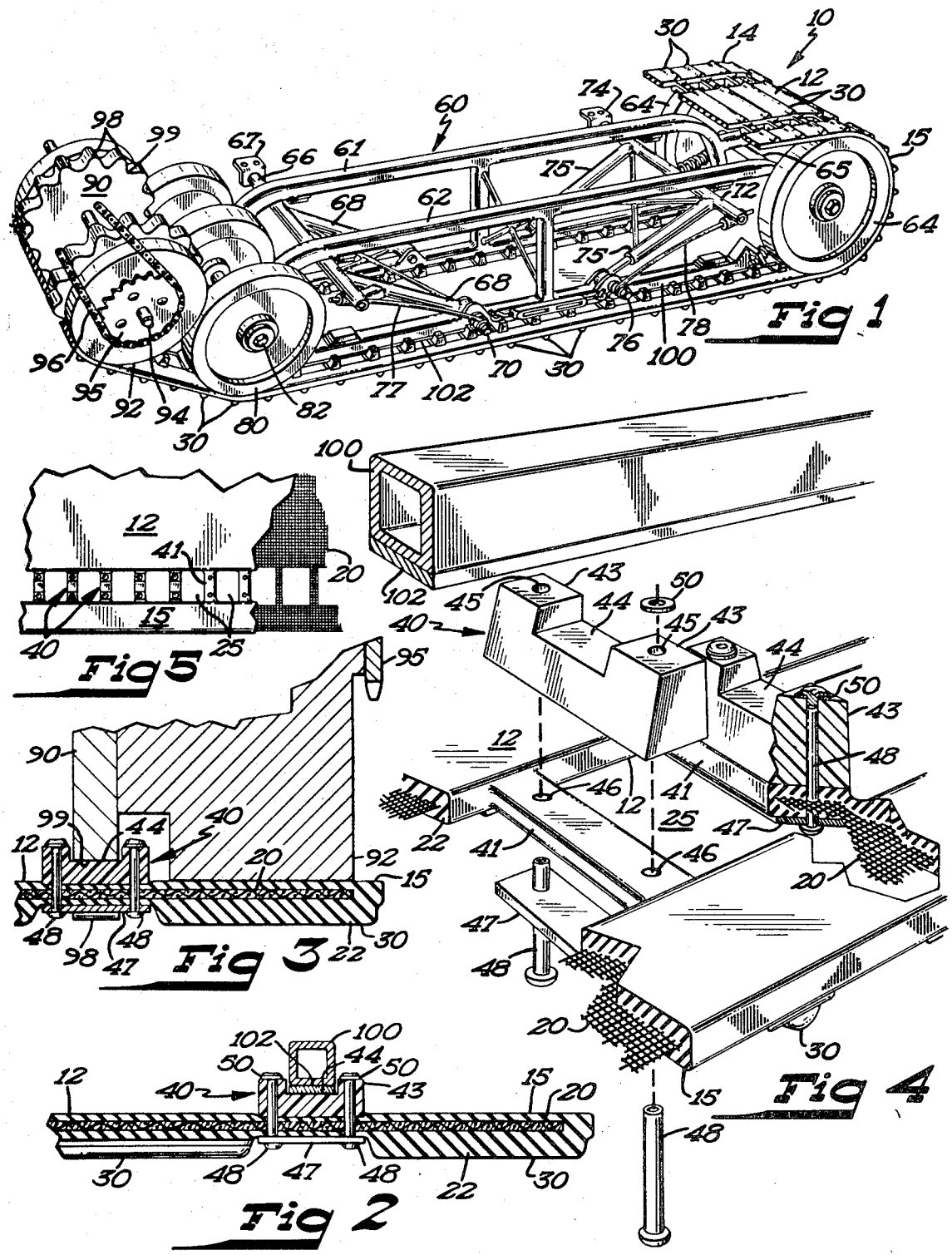

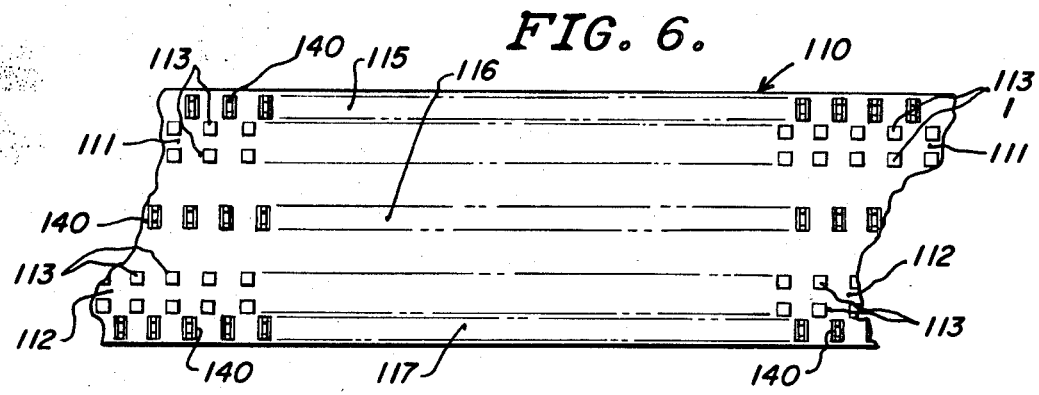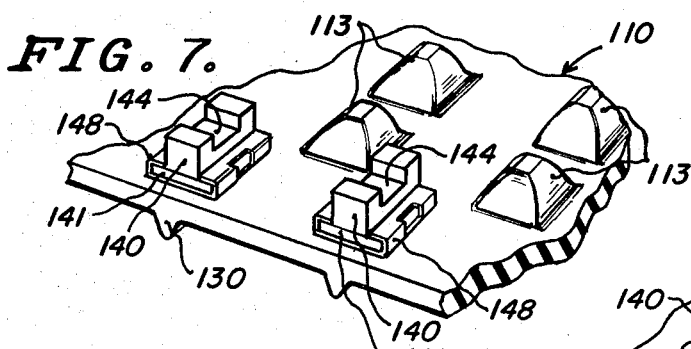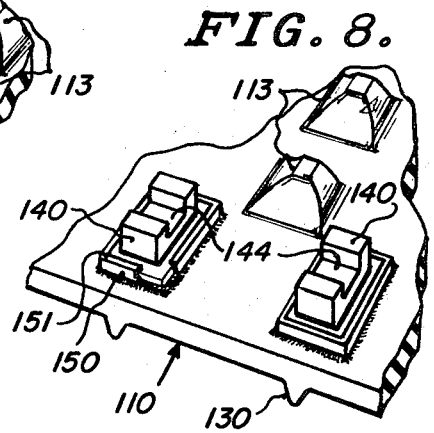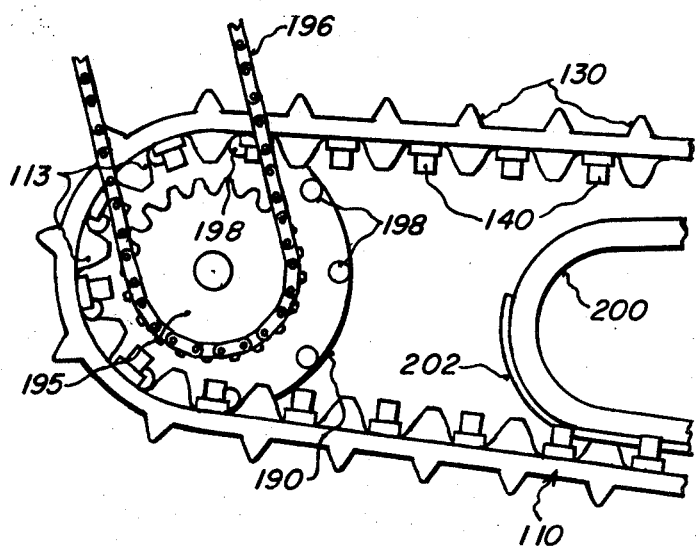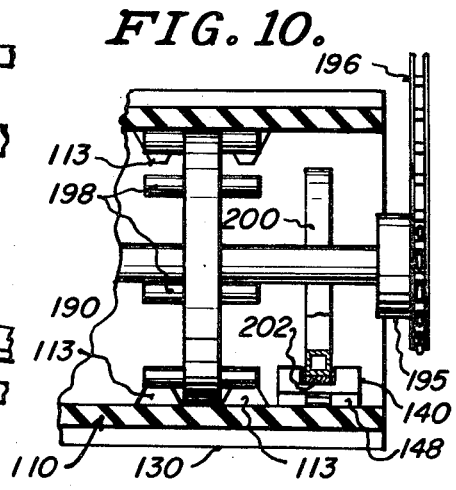

TREAD FOR MOTOR DRIVEN VEHICLES

The subject application is a continuation-in-part application of my prior application Ser. No. 63,626 filed Aug. 3, 1970, now abandoned.

My invention relates to tread supporting and driving means for motor vehicles, such as snowmobiles and tractors, and more particularly to an improved tread of this type having wearresistant low friction pads and guide engaging surfaces thereon.

Treads for vehicles, such as snowmobiles and tractors, are well known and consist of a variety of forms depending on the driving and support structure for the same. The problems involved in treads of this type include wear due to frictional forces, positive gripping surfaces for the driving teeth, alignment and guiding of the tread on the supporting structure, and strength of the tread itself.

The improved tread for motor driven vehicles, such as snowmobiles, of the present invention includes provisions for overcoming all of the weaknesses of the known and conventional designs. One embodiment of the improved tread incorporates an endless belt having a mesh imbedded therein with rows of openings in the mesh to define sprocket teeth engaging openings in a pair of rows along the extent of the belt. Slide pads are mounted on the interior surface of the belt at the sides of the openings, which slide pads are made of a plastic material having a low coefficient of friction. The pads are adapted to be engaged by the driving sprocket teeth and a slide rail or supporting structure for the tread to guide the same with reduced frictional forces to eliminate belt deterioration and to provide a flexible yet strong tread construction which improves the performance of the vehicle. The tread includes rib structures on the outer surface of the same for positive gripping of the surface over which the tread is moved and which will prevent skidding.

Another embodiment of the improved tread incorporates an endless belt with a pair of longitudinal rows of involute shaped lugs formed integrally with the tread which are formed similar to an involute-tooth from a gear so that the sprocket wheel having laterally or transverse extending cylindrical lugs will engage the tread lugs to drive the tread. In other words, the lugs extend the length of the belt, but there are no openings formed in the belt. The slide pads are mounted on the inner surface of the belt in two rows between the edges of the belt and the adjacent rows of tread lugs and a central row of slide pads, all of which engage a slide rail or supporting structure.

Therefore, it is the principal object of this invention to provide an improved tread for motor driven vehicles, such as snowmobiles.

Another object of this invention is to provide a tread having a slide pad positioned on the interior of the tread and made of a low coefficient of friction material to relieve heat and wear on the same.

Another object of this invention is to provide an improved tread for snowmobiles in which the slide pads are positively connected to the tread for improved operation of the same.

A further object of this invention is to provide an improved plastic material tread for snowmobiles or the like which has a continuous outer surface and has low coefficient of friction material slide pads secured thereto by means formed integrally with the plastic material.

These and other objects of this invention will become apparent from a reading of the attached description, together with the drawings wherein:

FIG. 1 is a perspective view of the support and driving structure for the tread showing the improved tread thereon and with parts broken away;

FIG. 2 is a sectional view of the tread and its relationship to a portion of the support as taken along lines 2—2 in FIG. 1;

FIG. 3 is a sectional view of a portion of the tread and its relation to the drive sprocket as taken along lines 3—3 in FIG. 1;

FIG. 4 is an exploded perspective view of that portion of the tread shown in FIG. 2;

FIG. 5 is a fragmentary view of the tread from the inside showing the location of the sprocket tooth holes thereon;

FIG. 6 is a top plan view of an inner section of tread showing an embodiment wherein there are no openings formed in the tread;

FIG. 7 is a fragmentary perspective view of the tread found in FIG. 6 showing the driving lugs and slide pads in more detail;

FIG. 8 is another fragmentary perspective view of a tread such as found in FIG. 6 in which pockets are molded in the tread to secure the slide pads in place;

FIG. 9 is a fragmentary side elevation view of a drive sprocket engaging the driving lugs on the tread and showing the relationship of the slide pads to the slide rails; and FIG. 10 is a fragmentary elevational view showing the relative position of the driving sprocket, the driving lugs formed integrally with the belt, and the slide rail mechanism.

My improved tread for motor driven vehicles such as snowmobiles is shown in the drawings in connection with a drive and suspension system with which it will normally be associated. The improved tread is formed as an endless belt 10, has a central portion 12 and side portions 14 and 15 which are held together as a composite unit by an internal mesh 20, which may be made of metallic material, or a polyester cord or glass fiber material. The belt or tread is preferably made of a rubber material or equivalent material, with the mesh being molded into the same and with the portions of the mesh extending between the center and side portions 12, 14 and 15 being covered with the rubber material, as indicated at 22. Two longitudinal rows of sprocket teeth receiving openings 25 are formed in mesh 20 between central portion 12 and side portions 14 and 15 of belt 10, as shown in FIG. 5. A plurality of raised ribs 30 are positioned on the outer surface of the tread at the side and center portions thereof which are aligned with a plurality of connecting portions 41 of the covered mesh between the openings in the tread. The ribs are discontinuous between the central and side portions of the tread defined generally by openings 25.

A plurality of slide pads 40 are positioned on the inner surface of the tread between each of the openings therein and project inwardly from the inner surface of the tread. Pads 40 are formed from blocks made of a relatively low friction plastic or polyester resin material, one form of which is known as "Hi-Fax 1900" which is manufactured by the Dayco Corporation of Three Rivers, Mich. The pads 40 are generally rectangular in shape, having a base width equal to the width of connecting portions 41 and a length equal to the spacing between the center portion 12 and side portions 14 and 15 of the belt, with the end surfaces of the blocks being straight and the side surfaces of the same facing openings 25 being inclined. Pads 40 have lugs 43 at the ends of the same with a recessed flat surface 44 in between the same. Apertures 45 extend through lugs 43 and align with apertures 46 extending through the connecting portion 41 of the tread. Suitable securing means such as metallic plates 47 and rivets 48 extend through apertures 45 and 46 to secure pads 40 to the tread with a head portion 49 of rivet 48 being located on the undersurface of the plate 47 and with the rivet being peened over a washer 50 to secure pads 40 in position on the tread. Thus the slide pads 40 will be positioned on either side of opening 25 into which the teeth of a sprocket wheel extend. The pads 40 are positioned in continuous rows on either side of the belt for cooperation with the drive sprockets and the guide structure and present a raised guide surface for the sprocket teeth and guide structure.

In FIG. 1 I have shown my improved tread as applied to a drive and suspension system for the same. The particular structure shown therein is known as a slide rail suspension system and is disclosed in the U.S. Pat. of Lowell T. Swenson et al., No. 3,485,312, dated Dec. 23, 1969, and entitled "Snowmobile Tread Drive And Suspension System." Since the details of this structure form no part of the present invention, the parts thereof will be referred to only generally and it will be understood that the same may take varying forms. In FIG. 1, the suspension frame 60 incorporates a pair of frame structures 61, 62 which are held together through suitable cross bracing. Suspension frame 60 mounts a rear pair of tread supporting wheels 64 which are journaled on a common shaft 65 and journaled in the frame 60. Frame 60 at one end is mounted to the frame of a snowmobile or vehicle (not shown) through a cross arm 66 connected to flanges 67 with the cross arm 66 connected to pivot arms 68 through pivotal connection 70 on the lower portion of a pair of side frames 61 and 62 of suspension frame 60. Similarly, the rear portion of the frame includes a transversely extending cross arm 72 with suitable mounting brackets 74 at the extremities of the same, adapted to be connected to the snowmobile frame (not shown). Cross arm 72 is connected to telescopic arms 75 and to a pivotal connection 76 on the lower portions of the side frame members 61, 62 of the suspension frame. Suitable biasing means, such as springs 77 and 78, bias arms 68 and 75 for pivotal movement and operation as identified in the above-mentioned Swenson et al. patent. A plurality of tread supporting wheels 80 may be employed and are mounted on a common shaft 82 which is carried by the suspension frame 60 through bearings (not shown).

A pair of drive sprocket wheels 90 together with load bearing wheels 92 coupled thereto are mounted on a common shaft 94 which will be mounted on the snowmobile frame or vehicle frame through means (not shown) with one of the load bearing wheels carrying a drive sprocket member 95 to which a suitable drive chain 96 is connected to the driving engine for the vehicle. The sprocket wheels 90 have teeth 98 which are so positioned relative to the tread and so shaped that they project through the openings 25 in the belt. The root 99 for the sprocket wheel teeth will ride against the flat surface 44 of the slide pads and the teeth are beveled so as to ride against the sides of the slide blocks as they move into and out of the openings 25 of the tread. The sprocket teeth 98, and the side frames 61 and 62 of the suspension frame are aligned longitudinally, as indicated by the tubular member 100 to ride in the notched surface 44 of the slide blocks. A suitable wear strip 102 of metal is attached to the bottom of side frames to contact the slide pads as the tread slides thereon. The notched surfaces of the slide pads 40 will guide the tread longitudinally over the suspension frame, preventing sidewise movement of the same and will insure a low friction sliding contact for the tread on the suspension frame.

As seen in FIG. 2, the lower tubular portion 100 of the suspension frame for each of the rows of slide pads will guide or slidably secure the tread over the lower portion of the frame having the wear plate 102 in contact with the flat surface 44 of the slide pads 40. Similarly shown in FIG. 3, the teeth 98 of the sprocket wheel 90 extend through the openings 25 in the tread with the root portion of the tooth engaging the flat or notched portion 44 of the pad to be guided therein. This will provide a positive drive with the load on the sprocket teeth being substantially borne by the slide pads and with the load bearing wheels 92 outboard of the same engaging the side portions 14 and 15 of the belt to be aligned with the supporting wheels 80 and 64 on the frame.

With the advent of polyurethane-elastomers as a primary material for forming snowmobile treads, it will be found that the invention may be carried out in a modified form through the use of a tread which does not employ any openings in the tread to receive sprocket wheels. Sprocket wheels used with this form of tread have transverse teeth, or studs formed laterally (as opposed to radial teeth) around the periphery of the sprocket wheel and the teeth engage cooperating teeth or lugs of the tread. As disclosed in FIGS. 6 through 10, a polyurethane tread 110 is shown as a fragment of the overall structure and includes two rows, 111 and 112 of a plurality of sprocket wheel engaging lugs 113. The sprocket wheel engaging lugs 113 are in the form of a plurality of involute teeth which are transversely aligned and separated in rows 111 and 112 by the width of the driving sprocket wheels.

A plurality of slide pads 140 are formed on tread 110 in three rows, 115, 116 and 117, the slide pads 140 being similar to those shown in FIGS. 1 through 5. Pads 140 located in rows 115, 116 and 117 provide a running surface which cooperates with three slide rails (not shown) in a similar manner to that of the two slide rails shown in FIG. 1.

Slide pads 140 have a base or pedestal 141 which is formed integrally with the slide pads and the base is used to anchor slide pad 140 to tread 110 through suitable means such as a plurality of clips 148 which may be formed from a metallic or plastic material which is suitably secured to tread 110 by means such as bonding with a resinous material, plastic cement, or by forming the upper portion of the tread in such a manner as to include clips 148. Also, clips 148 may be secured to tread 110 through other suitable means such as rivets, and clips 148 may include an indentation having a corresponding indentation in slide pads 140 to prevent a lateral movement with respect to tread 110.

Slide pads 140 are formed in a similar manner to that of slide pad 40 previously described in that they also include a notched portion 144 which serves as a guide for a corresponding slide rail such as a rail 200 (FIG. 9). It may also be desirable to include additional slide pads 144 or lessen the number, and it may be desirable to have the slide pads located in transverse alignment with the involute teeth 113 of the tread 110. FIG. 7 also discloses a pair of ribs 130 formed integrally with the outer portion of tread 110 to provide additional traction for the tread 110.

FIG. 8 discloses a means of securing slide pad 140 through the use of an integrally formed pocket 150 which is molded into the inner surface of tread 110. In other words, base elements 141 are forced into pocket 150 to fit under the edge of a lip portion 151.

FIGS. 9 and 10 disclose a sprocket wheel 190 having a plurality of laterally extending teeth 198 secured on both sides of the sprocket wheel and around its outer periphery. Teeth 198 engage the involute shaped lugs 113 of tread 110 to propell the tread. A chain sprocket 195 is spatially secured to sprocket wheel 190 so that a driving chain 196 does not interfere with teeth 198 as the sprocket wheel is driven. Lower rail 200 has a wear member 202 secured to the bottom thereof in the form of another steel member, and member 202 rides in notch 144 of slide pad 140. It will be noted that the slide pad is secured near the edge of tread 110 between row 112 of lugs 113 and the edge of the tread. Through the use of slide pads 140, and particularly the notches 144, a suitable means is provided whereby side-sway of the tread is controlled and this is particularly important where the machine is turning and the tread is sliding laterally at the same time power is applied to the tread.

It will also be recognized that where a polyurethane material is used to form a tread, reinforcing materials are used such as glass fibers or other suitable materials to strengthen the belt and yet provide a belt which will not stretch while remaining pliable and flexible.

The improved tread and suspension structure provides a suspension system and drive structure of the vehicle having a minimum amount of heat imparted to the belt to cause deterioration of the same while aiding in preventing side-sway of the tread with respect to the slide rails. The improved tread also produces improved characteristics of the same by having the slide rails slightly elevated above the inner surface of the tread, thus avoiding dirt and other abrasive heavier materials which would tend to destroy the slide pads.

Therefore, in considering this invention it should be remembered that the present disclosure is illustrative only and the scope of the invention should be determined by the appended claims.

What is claimed is:

1. A tread for motor driven vehicles constructed and arranged for use with a slide rail suspension system comprising, an endless belt having a center belt portion and side belt portions to either side of the same which have imbedded therein reinforcing mesh material, said belt having a plurality of driven elements arranged in a plurality of longitudinal rows, each adapted to be engaged by a driving sprocket wheel, a plurality of longitudinal rows of slide pads formed of a plastic material having a low coefficient of friction and means by which each row of said slide pads are secured in operable relationship with at least one of said rows of driven elements and projecting inwardly of the endless belt, said slide pads having notches therein disposed between raised lugs at the sides thereof, said notches adapted to receive and guide the slide rails when the endless belt is mounted on said vehicle having a slide rail suspension system.

2. The tread for motor driven vehicles of claim 1 in which the endless belt including the center and side belt portions are made of a rubber material with the mesh being imbedded in the center and side belt portions and being made of a metallic material.

3. The tread for motor driven vehicles of claim 1 in which the outer surface of the endless belt includes raised rib portions formed integral therewith which are positioned on the center and side belt portions and offset from the plurality of driven elements in the endless belt.

4. The tread for motor driven vehicles of claim 1 in which the slide pads are connected to the mesh at points between the center belt and side belt portions respectively.

5. The tread for motor driven vehicles of claim 4 in which the pads are mounted on the covered mesh by means of a plate and securing means extending through apertures in the plate and in the lugs of the slide pads.

6. The tread for motor driven vehicles of claim 5 in which the flat portion of the slide pads are elevated above the surface of the endless belt and adapted to engage one cooperating root of its driving sprocket wheels.

7. The tread for motor driven vehicles of claim 10 in which said plurality of driven elements includes sprocket teeth receiving openings extending completely through endless belt and reinforcing mesh material therein, said slide pads connected to and supported by the endless belt between the openings of the longitudinal rows of sprocket teeth openings, said slide pads also forming a sprocket wheel engaging face.

8. A snowmobile tread drive in combination comprising:

a. an elongated tread supporting means having a pair of members forming a pair of runners at the lower portion thereof, said tread supporting means being constructed and arranged to move within and relative to a snowmobile structure to which it is adapted to be connected;

b. first and second lever means pivotally mounted at one extremity on the pair of members of said tread supporting means and having pivot means at the other extremity adapted to be connected to the snowmobile structure to which said tread supporting means is to be attached, said first lever means having a fixed length and said second lever means including means movable with respect to said tread supporting means;

c. spring bias means associated with said first and second lever means;

d. a plurality of wheel means having their axes mounted on said tread supporting means for rotation therein and extending transversely of the tread supporting means;

e. sprocket means positioned adjacent the forward end of said tread supporting means and including means for imparting rotation thereto;

f. an endless elastic tread in the form of a substantially continuous strip having flexible reinforcing means positioned within said strip, said strip and reinforcing means having at least a pair of longitudinal rows of spaced sprocket teeth receiving elements formed therein and positioned around said tread supporting means and over said wheel and sprocket means;

g. slide pad means secured to said strip adjacent the longitudinal rows of tooth engaging elements and projecting inwardly of said endless tread, said slide pad means having a notched central portion provided with a surface made of a low coefficient of friction material to define a runner engaging face for the interior of said tread with the notched portion of said slide pads bearing against and supporting the runners of said tread supporting means and guiding the endless tread.

9. The combination of claim 8 and including a wear strip positioned on the runners of said tread supporting means and engaging said slide pad means on the endless tread.

10. An endless elastic tread for motor driven vehicles constructed and arranged for use with a slide rail suspension system comprising, a substantially continuous strip having flexible reinforcing means positioned within said strip, said strip and reinforcing means having at least a pair of longitudinal rows of spaced sprocket teeth receiving elements formed as a part of said endless elastic tread, slide pad means secured to said strip in operable relationship to at least said pair of longitudinal rows of tooth engaging elements and projecting inwardly of said endless tread, each of said slide pad means including clip means secured to said continuous strip having first interlocking elements and further including pad means formed from a low coefficient of friction material having second interlocking elements, said first and second interlocking elements cooperatively securing said slide pad means to said strip thereby defining a slide rail engaging face for the interior of said tread, and said strip including a ground engaging raised face on the outer surface thereof.

* * * * *